United States Patent
Murakami et al.

(10) Patent No.: US 9,618,613 B2
(45) Date of Patent: Apr. 11, 2017

(54) RADIO COMMUNICATION APPARATUS, RADIO COMMUNICATION METHOD, AND RADIO COMMUNICATION SYSTEM

(71) Applicant: Hitachi Kokusai Electric Inc., Tokyo (JP)

(72) Inventors: Hiroyuki Murakami, Tokyo (JP); Satoru Ujiie, Tokyo (JP); Kanemi Sasaki, Tokyo (JP); Shinya Kobayashi, Tokyo (JP)

(73) Assignee: HITACHI KOKUSAI ELECTRIC INC. (JP)

( * ) Notice: Subject to any disclaimer, the term of this patent is extended or adjusted under 35 U.S.C. 154(b) by 274 days.

(21) Appl. No.: 14/380,396

(22) PCT Filed: Jan. 17, 2013

(86) PCT No.: PCT/JP2013/050792
§ 371 (c)(1),
(2) Date: Aug. 22, 2014

(87) PCT Pub. No.: WO2013/125265
PCT Pub. Date: Aug. 29, 2013

(65) Prior Publication Data
US 2015/0062335 A1 Mar. 5, 2015

(30) Foreign Application Priority Data
Feb. 22, 2012 (JP) .................. 2012-036044

(51) Int. Cl.
*G01S 13/86* (2006.01)
*H04W 24/04* (2009.01)
(Continued)

(52) U.S. Cl.
CPC ............ *G01S 13/867* (2013.01); *G06T 11/60* (2013.01); *H04N 5/23203* (2013.01);
(Continued)

(58) Field of Classification Search
None
See application file for complete search history.

(56) References Cited

U.S. PATENT DOCUMENTS

2004/0207743 A1* 10/2004 Nozaki ............. H04N 5/23212
348/333.12
2007/0266312 A1* 11/2007 Ayaki ..................... G06K 9/228
715/273
(Continued)

FOREIGN PATENT DOCUMENTS

JP H07-135415 A 5/1995
JP 2005-72780 A 3/2005
(Continued)

OTHER PUBLICATIONS

International Search Report.

*Primary Examiner* — Sath V Perungavoor
*Assistant Examiner* — Janese Duley
(74) *Attorney, Agent, or Firm* — Bacon & Thomas, PLLC

(57) ABSTRACT

A radio communication apparatus includes a radio transmitting/receiving unit having a directional antenna and a storage unit storing reference image data and captured image data obtained by an imaging unit. The imaging unit has an optical axis oriented in the same direction as the radio wave direction of the directional antenna and captures an image related to a line of sight of the other opposed radio communication apparatus. The radio communication apparatus further includes an image processing unit comparing the reference image data with the captured image data and a control unit detecting, from the comparison result, and informing that an obstacle is traveling toward the aforementioned radio wave direction.

3 Claims, 6 Drawing Sheets

(51) Int. Cl.
*G06T 11/60* (2006.01)
*H04N 5/232* (2006.01)
*H04N 7/18* (2006.01)

(52) U.S. Cl.
CPC ............ *H04N 7/183* (2013.01); *H04W 24/04* (2013.01); *G06T 2207/10004* (2013.01); *G06T 2207/30181* (2013.01)

(56) References Cited

U.S. PATENT DOCUMENTS

| 2010/0067442 A1* | 3/2010 | Van der Wal | ......... | H04W 92/20 |
| | | | | 370/328 |
| 2013/0135146 A1* | 5/2013 | Ransom | ................. | H01Q 3/005 |
| | | | | 342/357.36 |

FOREIGN PATENT DOCUMENTS

| JP | 2011-24154 A | 2/2011 |
| JP | 2011-176561 A | 9/2011 |
| JP | 2011-239223 A | 11/2011 |

* cited by examiner

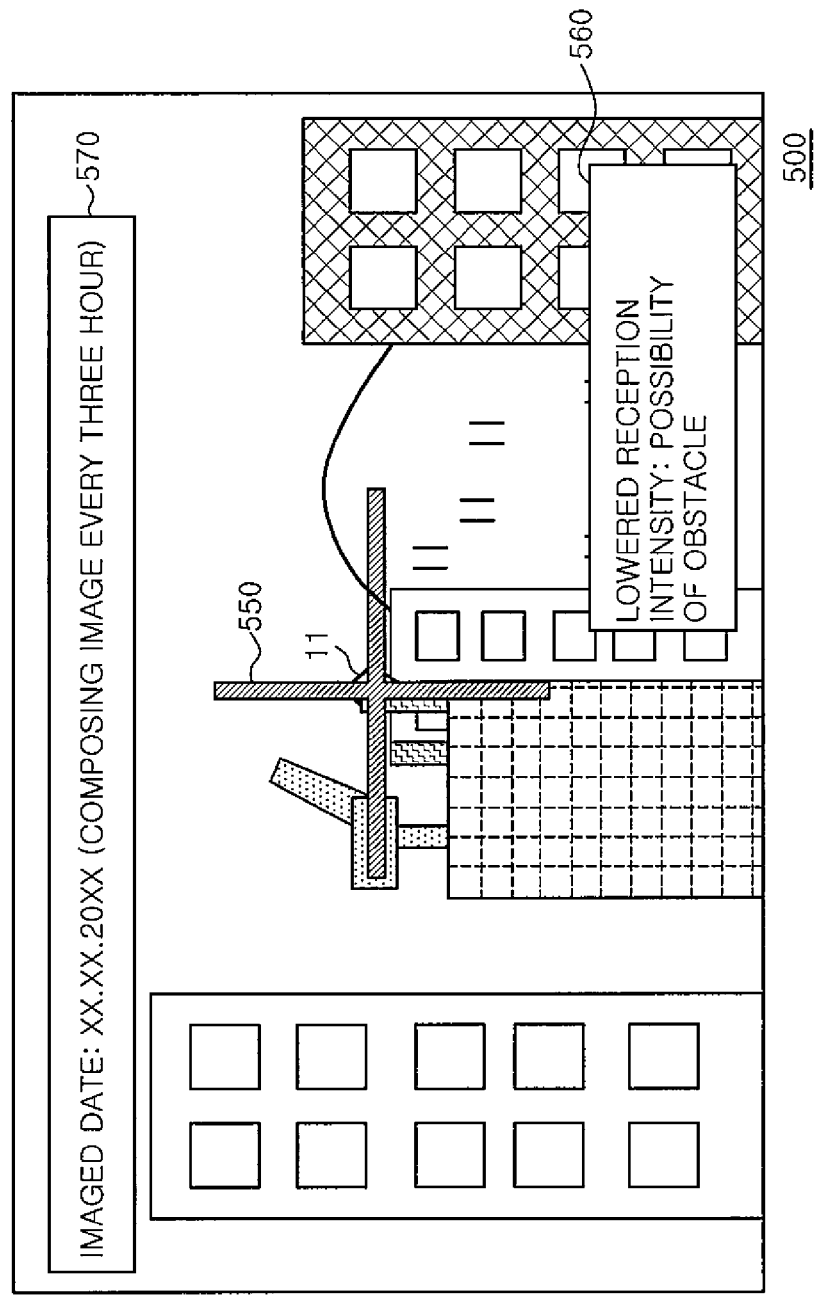

RADIO COMMUNICATION APPARATUS, RADIO COMMUNICATION METHOD, AND RADIO COMMUNICATION SYSTEM

FIELD OF THE INVENTION

The present invention relates to a radio communication apparatus, a radio communication method and a radio communication system, and particularly to a P-to-P digital radio communication apparatus, a radio communication method and a radio communication system using a directional antenna.

BACKGROUND OF THE INVENTION

In the modern times, a digital radio system has become one of essential techniques due to its reliability and the fact that a radio band can be used efficiently.

In recent years, along with the spread of the Internet, there is an increasing demand for high-speed, large-capacity communications using a wireless medium. Therefore, a radio communication system using a radio communication apparatus such as a radio repeater for P-to-P (point-to-point) connection of LANs (Local Area Networks) of the bases of separate buildings or the like has been developed and put into practical use.

In the radio communication system for P-to-P (point-to-point) communications, carriers in a millimeter wave band and a quasi-millimeter wave band having a short wavelength and high directivity may be used. In this case, it is required to secure a "view" in which an obstacle is not present between one radio communication apparatus and the other radio communication apparatus.

However, even if it was appropriate when installing the radio communication system, a failure may occur in the radio communications due to various factors as the system continuously operates for a long time.

For example, the radio communication system for P-to-P (point-to-point) communications is installed and used after being moved freely unlike the authorized fixed station. Accordingly, there is no protection of a propagation path by law, and the communications may not be performed due to an obstacle in the propagation path. That is, if a building is newly built in the radio propagation path or a tree grows to block the propagation path, the radio may be disconnected.

In addition, since there is directivity of the carriers in the millimeter wave band and the quasi-millimeter wave band, in rare cases, the direction may be shifted due to strong wind and an impact, which is resulted in a failure of the radio communications.

For example, Patent Document 1 describes a radio communication device characterized in that a camera is embedded in a radio device for fixed communications, and the direction of the radio device for fixed communications is changed to display an opponent radio communication station in a specific range of the monitor screen of the camera (hereinafter, referred to as Related Art 1).

Further, e.g., Patent Document 2 describes a radio communication system including at least two antennas, a radio unit for performing radio communications with an opposing radio device through the two antennas, and a control unit for controlling the switching of transmission and reception of the two antennas, the control unit switching the transmission and reception of the two antennas by receiving a predetermined timing signal (hereinafter, referred to as Related Art 2).

Patent Document 1: Japanese Patent Application Publication No. 2005-072780
Patent Document 2: Japanese Patent Application Publication No. 2011-176561

In the conventional radio communication system, when a failure occurs in the radio communications, in an important radio line, it was necessary to restore the system by determining the cause quickly.

However, in the conventional radio communication system, monitoring is performed only by measuring a S/N ratio or reception level. Thus, in order to discover the true cause of the failure such as construction of the building, there is a problem that it is necessary for an operator to go to the installation location of the radio communication device and perform a checking operation. Therefore, in the case where the radio device is installed in a distant area or place where the operator cannot easily access, it takes time to identify and recover the failure.

However, in the device described in Related Art 1, it was able to only see the image for adjusting the direction of the antenna. Thus, it was impossible to estimate the cause of the failure of the radio communications during the operation, or know whether the radio wave condition is likely to become worse afterwards. Further, Related Art 2 fails to disclose a technique of estimating the cause of a failure of the radio communications.

SUMMARY OF THE INVENTION

In view of the above, the present invention has been conceived to solve the problems described above.

In accordance with an aspect of the present invention, there is provided radio communication apparatus including: a radio transmitting/receiving unit using a directional antenna; and an imaging unit having an optical axis which coincides with a direction of radio waves of the directional antenna, the imaging unit being configured to capture an image in the direction of the radio waves.

The imaging unit is configured to capture the image at any one of, at least, a periodic timing of a predetermined interval, a desired timing, and timing when a radio wave condition is changed.

The radio communication apparatus may further include: a storage unit for storing captured image data and reference image data captured by the imaging unit; an image processing unit for comparing the reference image data with the captured image data; and a control unit configured to detect and notify that an object is toward a direction to block the radio waves from a result of said comparing.

In accordance with another aspect of the present invention, there is provided a radio communication method including: transmitting radio waves having high directivity by a radio transmitting/receiving unit; and capturing an image in a direction of the radio waves by an imaging unit. The direction of the radio waves coincides with an optical axis.

The imaging unit captures an image at any one of, at least, a periodic timing of a predetermined interval, a desired timing and timing when a radio wave condition is changed.

The radio communication method may further include:
storing captured image data and reference image data captured by the imaging unit in a storage unit; comparing the reference image data with the captured image data by an image processing unit; and detecting and notifying that an object is toward a direction to block the radio waves from the comparison result by a control unit.

In accordance with still another aspect of the present invention, there is provided a radio communication system including: radio communication apparatuses arranged to face each other; and a maintenance device of the radio communication apparatuses.

Each of the radio communication apparatuses includes: a radio transmitting/receiving unit using a directional antenna; and an imaging unit having an optical axis, which coincides with a direction of radio waves of the directional antenna, to capture an image in the direction of the radio waves.

The imaging unit is configured to capture an image at any one of, at least, a periodic timing of a predetermined interval, a desired timing, and timing when a radio wave condition is changed.

Each of the radio communication apparatuses may further include: a storage unit to store captured image data and reference image data captured by the imaging unit; an image processing unit to compare the reference image data with the captured image data; and a control unit configured to detect that an object is toward a direction to block the radio waves from a result of said comparing and notify the result to the maintenance device.

The maintenance device may include: a display unit for displaying the image captured by each of the radio communication apparatuses; and a control unit configured to draw a mark in the direction of the radio waves of the captured image.

In accordance with the embodiments of the present invention, by browsing the reference image data and the captured image data, it is possible to provide a radio communication apparatus capable of estimating the cause of the failure of the radio communications during the operation, or finding out whether the radio wave condition is expected to become worse afterwards or not.

BRIEF DESCRIPTION OF THE DRAWINGS

FIG. 6 is a display example of alert information 115 displayed on the maintenance device 20 in accordance with the embodiment of the present invention.

DETAILED DESCRIPTION OF THE EMBODIMENTS

Control Configuration of a Radio Communication System X

Figure 1:
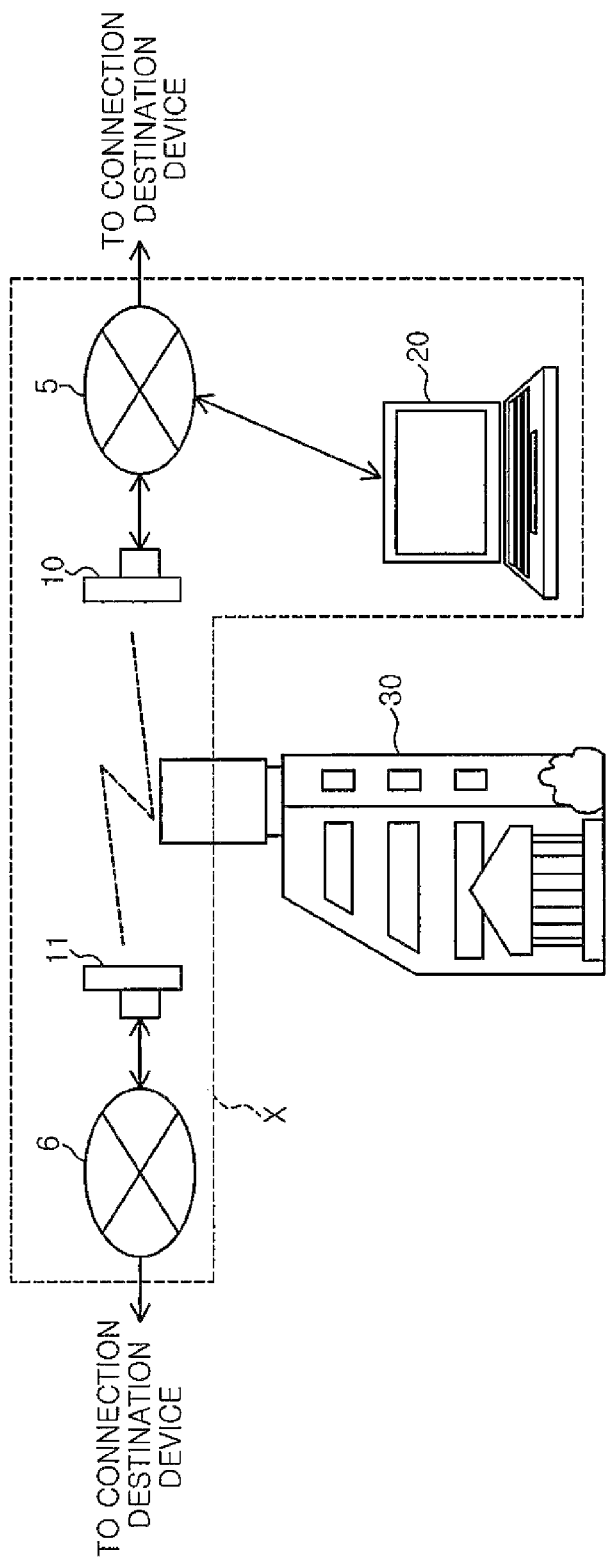
FIG. 1 is a conceptual diagram showing a configuration of a radio communication system X in accordance with an embodiment of the present invention.

First, a configuration example of a radio communication system X in accordance with an embodiment of the present invention will be described with reference to FIG. 1.

In the radio communication system X, radio communication apparatuses 10 and 11 (communication means between bases) perform opposing communications as master and slave apparatuses. The radio communication apparatus 10 and 11 are wirelessly connected to networks 5 and 6 that are external networks. Further, in the radio communication system X, a maintenance device 20 (data analyzing means) is also connected to the network 5 or the network 6.

For example, the network 5 (or 6) is an IP network of an optical fiber, a LAN network such as 1000BASE-T, a dedicated line or the like. The network 5 (or 6) may be connected to a connection destination device such as a hub, router, PC (Personal Computer), server, smart phone, tablet computer and the like.

Further, the network 5 (or 6) may also be connected to another network such as a PHS (Personal Handy-phone System) network, a mobile phone network and the Internet by using a router or the like.

The radio communication apparatuses 10 and 11 are opposite radio apparatuses for the P-to-P communications and have the same configuration. Each of the radio communication apparatuses 10 and 11 functions as a radio repeater for data communications between bases using a millimeter-wave band, quasi-millimeter wave band or the like of, e.g., 25 GHz, which has a high directivity. For example, as described above, any one of the radio communication apparatuses 10 and 11 is set as a master or slave apparatus to perform full-duplex opposing communications.

The radio communication apparatus 10 (or 11) transmits alert information (warning information) 115 including an image when detecting a failure in radio communications, e.g., when an obstacle 30 (object) is built. Further, the radio communication apparatus 10 (or 11) captures images periodically at predetermined intervals and transmits the alert information 115 to the maintenance device 20 if there is an abnormality in the images.

The following description is made by using the radio communication apparatus 10 as a representative example.

The maintenance device 20 may be a PC, a general-purpose machine, a server or the like for maintenance and management, which is used by a manager of the radio communication system X.

The maintenance device 20 may also instruct the radio communication apparatus 10 (or 11) to acquire captured image data, data of various sensors, intensity data of received signal or the like.

Configuration of the Radio Communication Apparatus 10

Figure 2:
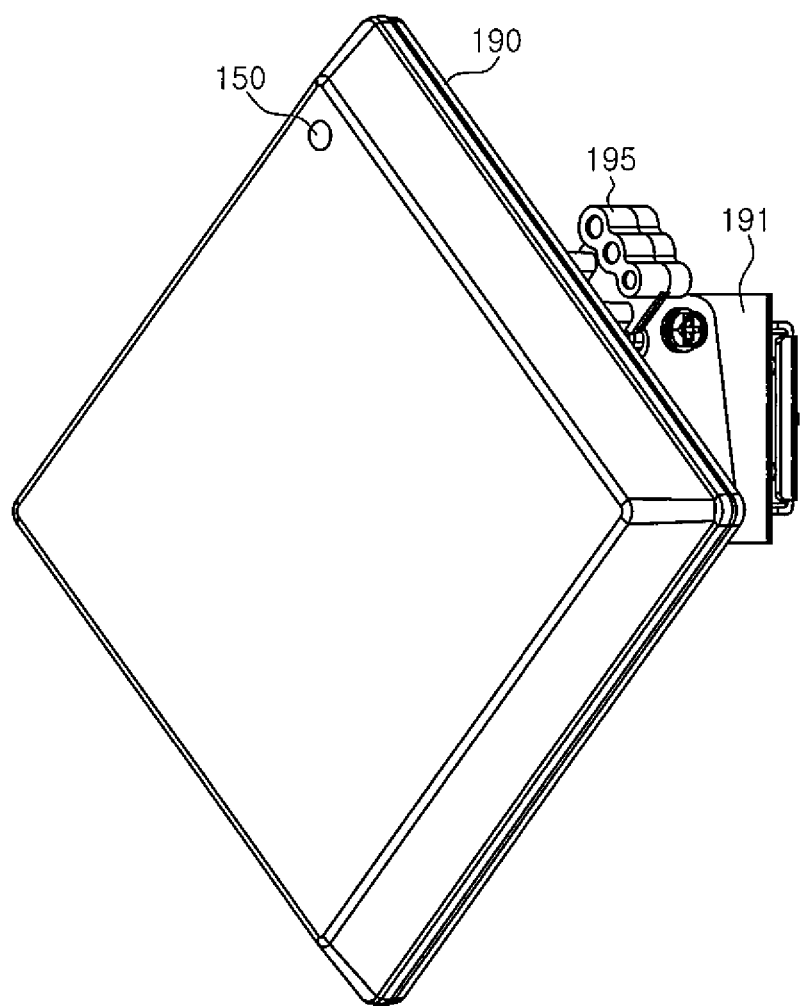
FIG. 2 is an external perspective view of a radio communication apparatus 10 in accordance with the embodiment of the present invention.

Next, the external appearance of the radio communication apparatus 10 will be described with reference to FIG. 2.

The radio communication apparatus 10 mainly includes a housing 190 which incorporates an antenna and functional parts, and an installation portion 191 that is a bracket attached to a pole or the like.

Further, the housing 190 includes a scope portion 195 for identifying a direction of directivity of the antenna. Further, the housing 190 includes an imaging unit 150 such as a camera whose optical axis is set to coincide with the direction of directivity of the antenna.

That is, the imaging unit 150 captures images only within a viewing angle of, e.g., about several degrees in the direction of directivity of the antenna. Preferably, the imaging unit 150 is configured such that the optical axis of the camera is hardly changed by a camera platform or the like. Thus, it is possible to reduce problems of privacy in relation to the radio communication apparatus 10.

Figure 3:
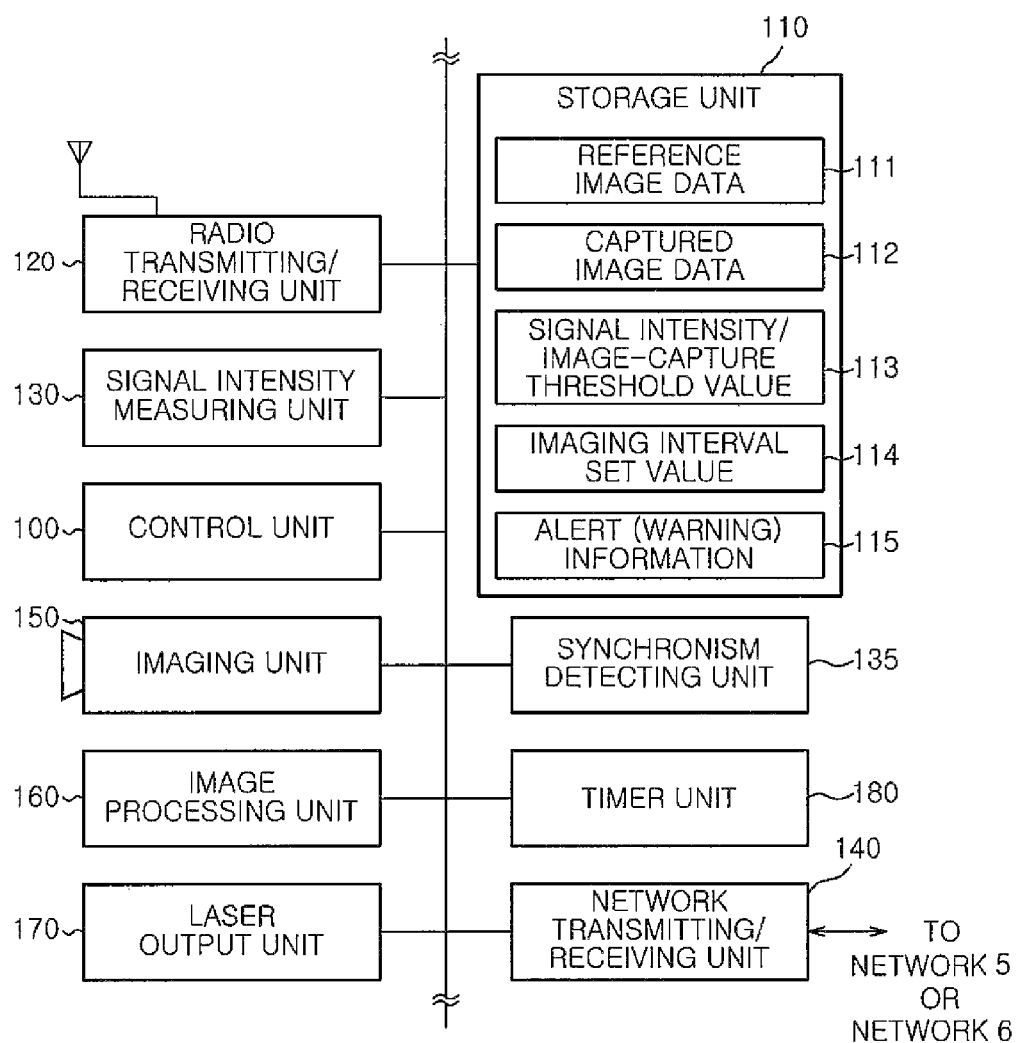
FIG. 3 is a block diagram showing a control configuration of the radio communication apparatus 10 in accordance with the embodiment of the present invention.

Next, a control configuration of the radio communication apparatus 10 is described in detail with reference to FIG. 3.

The radio communication apparatus 10 mainly includes, as functional parts in the housing 190 (shown in FIG. 2), a control unit 100 (control means), a storage unit 110 (reference image storage means, captured image storage means or the like), a radio transmitting/receiving unit 120 (radio transmitting/receiving means), a signal intensity measuring unit 130 (signal intensity measuring means), a synchronism detecting unit 135 (synchronism detecting means), a network transmitting/receiving unit 140 (network transmitting/receiving means), the imaging unit 150 (image capturing means), an image processing unit 160 (image processing means), a laser output unit 170 (laser output means) and a timer unit 180 (timer means). The respective units are connected to each other by, e.g., a common bus or the like.

The control unit 100 is a control operation part such as a CPU (Central Processing Unit) that is a GPP (General Purpose Processor), a MPU (Micro Processing Unit) and a DSP (Digital Signal Processor).

The control unit 100 controls each unit, and instructs the imaging unit 150 to capture images according to signals from the signal intensity measuring unit 130, the synchronism detecting unit 135 and the timer unit 180.

Further, the control unit 100 may also obtain information from the Internet or the like through the network 5.

The storage unit 110 is a storage means such as a RAM (Random Access Memory), ROM (Read-Only Memory), flash memory and HDD (Hard Disk Memory). The storage unit 110 stores data or a program to be executed by the control unit 100.

In addition, the storage unit 110 stores various setting values or image data captured by the imaging unit 150 and processed by the image processing unit 160. The image data will be described in detail later.

Further, e.g., the storage unit 110 may include a removable recording medium such as a USB (Universal Serial Bus) memory and SD (Secure Digital) card. This recording medium may also store image data.

The radio transmitting/receiving unit 120 is a radio transmitting/receiving part including the antenna, an RF means (i.e., radio communication means), a digital modulation means, an A/D conversion means, a D/A conversion means, an Ethernet® packet encoding means, an encryption means and the like.

As the antenna of the radio transmitting/receiving unit 120, it is preferable to use a directional antenna such as a pencil beam antenna or the like in which carrier waves are difficult to spread. The radio transmitting/receiving unit 120 may perform transmission and reception of radio waves in a manner of TDD (Time-Division Duplex) communication, FDD (Frequency-Division Duplex) communication or the like.

The signal intensity measuring unit 130 is a part of measuring the received signal intensity of the radio waves from the radio transmitting/receiving unit 120, or the received signal intensity related to the reception quality such as a S/N ratio of the received signal.

The synchronism detecting unit 135 is a part of detecting a preamble or synchronizing signal included in a radio signal to restore the synchronizing signal wirelessly transmitted and checking whether the synchronizing signal has been restored or not.

The network transmitting/receiving unit 140 is a part such as a LAN interface of, e.g., 1000BASE-T/100BASE-TX standard, for connection to the network 5 or 6.

Further, the network transmitting/receiving unit 140 may include a battery or a power supply unit for performing the power supply by, e.g., an Ethernet® cable power supply system.

Further, the network transmitting/receiving unit 140 may be separately connected to an external hub, router, load balancer or the like.

The imaging unit 150 includes an optical imaging device (camera) such as a CMOS (Complementary Metal Oxide Semiconductor), a CCD (Charge Coupled Device) and an imaging tube, an A/D converter and the like. The imaging unit 150 may capture an image by converting an optical signal of infrared rays or visible light for monochrome/color pictures into an electrical signal.

Further, the imaging unit 150 may include an optical lens capable of capturing images within only a predetermined range of the viewing angle of about 0.5 to 5 degrees in which the radio wave direction of the directional antenna of the radio transmitting/receiving unit 120 coincides with the optical axis of the camera, a zoom lens, and a cover provided to prevent intrusion of rainwater, dust and the like.

Accordingly, the imaging unit 150 mainly captures an image within only a narrow range of "viewing" the radio communications with the radio communication apparatus 11 facing the radio communication apparatus 10. Therefore, since it is not necessary to use a large imaging device, the manufacturing cost can be reduced. Further, it is possible to consider the privacy.

The imaging unit 150 may be integrated with the radio communication apparatus 10 or may be separated from the radio communication apparatus 10. Further, the imaging unit 150 may capture a moving image as well as a still image.

The image processing unit 160 is a circuit part for image processing including a DSP (Digital Signal Processor), a GPU (Graphics Processing Unit), an ASIC (Application Specific Integrated Circuit).

The image processing unit 160 mainly converts an electric signal from the imaging unit 150 into a still image in a predetermined format such as JPEG/JPEG2000/PNG/BMP by image processing. In this case, the image processing unit 160 may also perform compression of image capacity, conversion into vector data and the like.

The image processing unit 160 may create an average image and compute a difference (AND, XOR) between images. The image processing unit 160 may also analyze a feature or noise component of the image by using FFT (Fast Fourier Transform), wavelet analysis or the like. Thus, it is possible to estimate the true cause of a failure of the radio communications such as construction of a building, rain or the like.

In addition, the image processing unit 160 may also convert images of captured image data 112 in time series into moving image data of moving images GIF, AVI, MOV, MPEC and the like. Thus, it is possible to browse, e.g., the progress of the construction of the building from the maintenance device 20.

The laser output unit 170 is a part of outputting a laser signal of, e.g., infrared rays detectable by the imaging unit 150 in the same direction as the radio wave direction of the antenna of the radio transmitting/receiving unit 120.

The laser signal of the laser output unit 170 may be detected by the image processing unit 160, and the control unit 100 may determine whether there is a "view" or not.

The timer unit 180 is a part such as an interval timer or a battery backup-real time timer with quartz. The timer unit 180 measures the time of year, day, hour, minute, second and the like.

Further, the control unit 100 may acquire the time from a time server of the Internet or the like and set the time of the timer unit 180.

In addition, the radio communication apparatus 10 may include sensors for acquiring the data relating to the surrounding environment such as rainfall, sunlight, weather, wind, wind direction, temperature, humidity and the like. Values obtained from the sensors may also be stored in the storage unit 110.

Further, the radio communication apparatus 10 may include, e.g., a wireless LAN interface, a serial/USB terminal and a received power monitor terminal connected directly to the maintenance device 20.

Further, the storage unit 110 includes, as the image data captured by the imaging unit 150, reference image data 111, the captured image data 112, a signal intensity/image-capture threshold value 113, an imaging interval set value 114, and the alert information 115.

The reference image data 111 relate to the images captured by the imaging unit 150 during installation of the radio communication apparatus 10 and are converted into a predetermined format by the image processing unit 160.

The captured image data 112 relate to the images captured when the predetermined interval or a failure of the radio communications occurs and are converted into a predetermined format after image processing including the average and difference by the image processing unit 160. The image processing unit 160 may compare the captured image data 112 with the reference image data 111.

The signal intensity/image-capture threshold value 113 relate to a threshold value and the like for performing image capturing by a decrease in S/N ratio or the signal intensity. The signal intensity/image-capture threshold value 113 also stores a correlation value of the data corresponding to the causes of various failures of the radio communications relating to communication errors such as synchronization or the received signal intensity. The signal intensity/image-capture threshold value 113 may be set individually according to the characteristics of the radio communication system X. The signal intensity/image-capture threshold value 113 may be set as a predetermined value and predetermined conditions in the maintenance device 20 in order to investigate the cause of the failure of the radio communications.

The imaging interval set value 114 relate to the time for performing image capturing at a predetermined interval, the timing of transmission to the maintenance device 20 or the like. The imaging interval set value 114 may also be set as a predetermined value according to the characteristics of the radio communication system X.

The alert information 115 is for warning to be transmitted to the maintenance device 20, which includes at least the captured image data 112 and cause information for estimating the cause of the failure of the radio communications. In addition, the alert information 115 may include the reference image data 111, a composite image or the like in some cases. The alert information 115 will be described in detail later.

Configuration of the Maintenance Device 20

Figure 4:
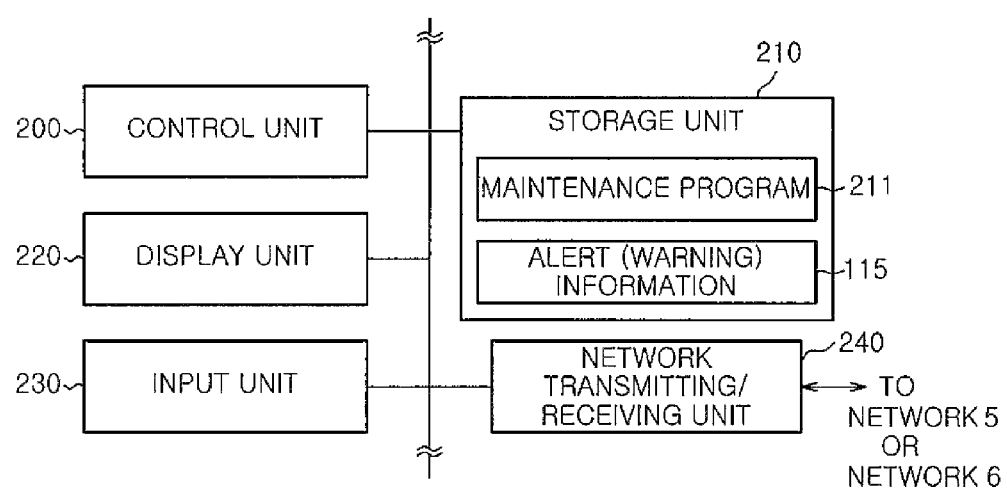
FIG. 4 is a block diagram showing a control configuration of a maintenance device 20 in accordance with the embodiment of the present invention.

Next, the configuration of the maintenance device 20 is described with reference to FIG. 4.

The maintenance device 20 is configured to include a control unit 200 (control means), a storage unit 210 (storage means), a display unit 220 (display means), an input unit 230 (input means), a network transmitting/receiving unit 240 (network transmitting/receiving means) and the like.

The control unit 200 is a control operation part such as a CPU, a GPU and the like and executes a maintenance program 211 of the storage unit 210.

The storage unit 210 is a storage part such as a RAM, ROM, HDD, flash memory and the like. The maintenance program 211 is installed and stored in the storage unit 210. Further, the storage unit 210 may store the alert information 115 obtained from the radio communication apparatus 10 (or 11).

The display unit 220 is a display part such as a LCD (Liquid Crystal Display) monitor, and an organic EL display and the like. The display unit 220 may display a message or an image captured by the radio communication apparatus 10 (or 11), and it may be browsed by the manager.

The input unit 230 is an input part of a pointing device such as a mouse, touch panel or the like, a keyboard and the like. The control unit 200 detects a command of the manager with respect to the input unit 230 by using the GUI (Graphical User Interface) of the maintenance program 211.

The network transmitting/receiving unit 240 is a network connecting part for connection to, e.g., a LAN, WLAN (Wireless LAN), WiMAX®, mobile telephone network, PHS network or the like. The network transmitting/receiving unit 240 executes an image capture command to the radio communication apparatus 10 (or 11), and receives the alert information 115 via the network 5.

The maintenance device 20 may be connected to the Internet network via the WAN (Wide Area Network). That is, the maintenance device 20 may access the network 6 via the WAN even though it is connected to the network 5. Thus, even if a failure occurs in the radio communications between the radio communication apparatuses 10 and 11, it is possible to receive the alert information 115 from both the radio communication apparatuses 10 and 11.

Image Capturing Process by the Radio Communication Apparatus 10

Figure 5:
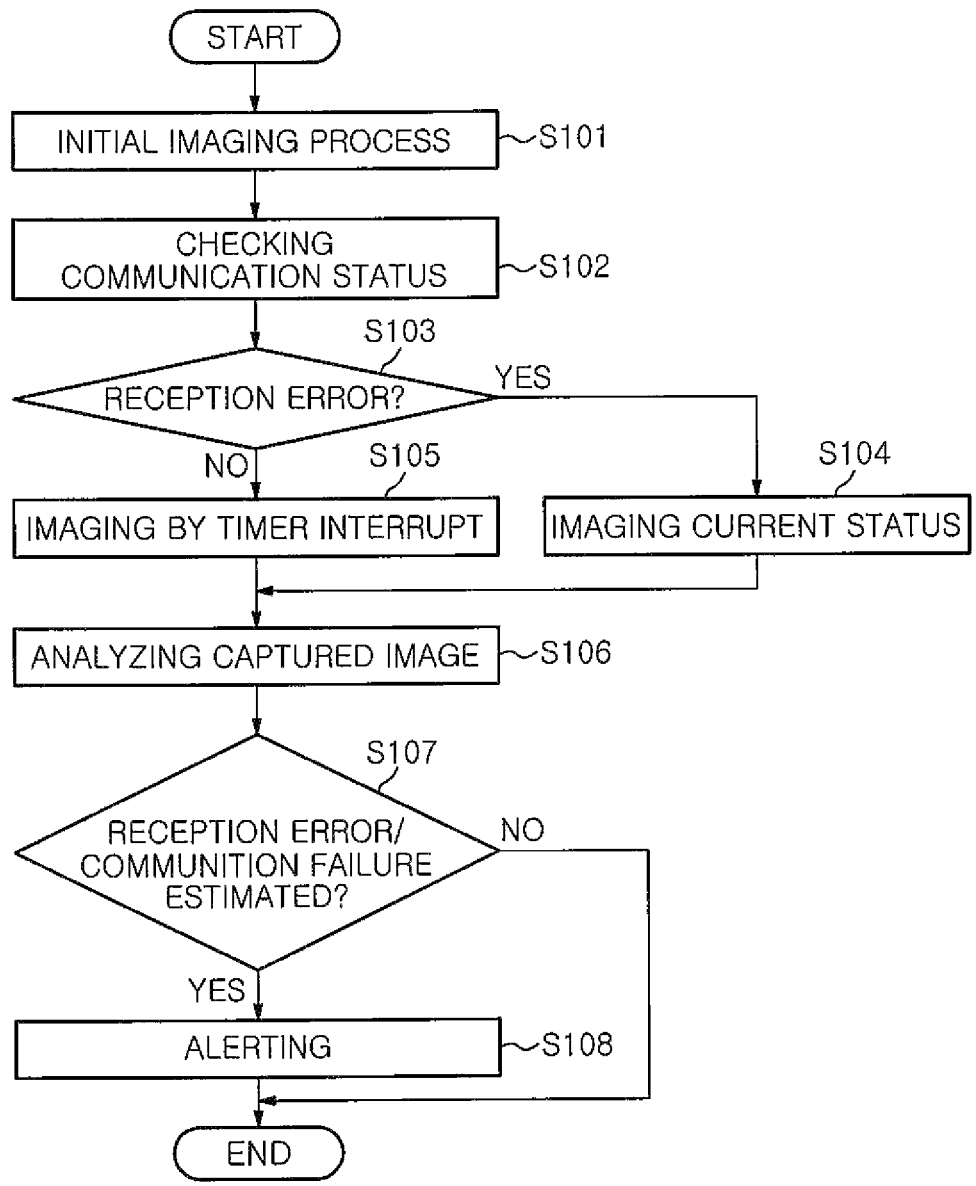
FIG. 5 is a flowchart showing an imaging process of the radio communication apparatus 10 in accordance with the embodiment of the present invention.

Hereinafter, an image capturing process by the radio communication apparatus 10 is described with reference to FIGS. 5 and 6.

In the image capturing process in accordance with the embodiment of the present invention, first, the radio communication apparatus 10 captures an initial image during installation and stores the captured image.

The radio communication apparatus 10 detects a synchronizing signal in transmission and reception, and measures the intensity of the received signal. Then, if the intensity of the received signal is abnormal, the radio communication apparatus 10 captures an image and transmits the alert information 115 (shown in FIG. 3) including image information.

Further, the radio communication apparatus 10 performs image capturing periodically at predetermined intervals by the timer, and transmits the alert information 115 when there is an abnormality in a difference image.

Further, as described below, the image capture command is inputted by the manager from the maintenance device 20, and, thus, it is possible to perform image capturing at a desired timing.

Since image capturing is performed at the predetermined interval and at the timing of the failure of the radio communications, it is possible to easily investigate the true cause of the failure.

Hereinafter, the image capturing process in accordance with the present embodiment is described in detail step by step with reference to a flowchart in FIG. 5. The following process is executed by the control unit 100 of the radio communication apparatus 10 by using hardware resources in cooperation with each unit.

First, in step S101, the control unit 100 performs an initial imaging process.

In this process, after performing initial setting such as installation to the base, the control unit 100 captures an image by the imaging unit 150 and stores the captured image as the reference image data 111.

At this time, the control unit 100 may set a timer to perform image capturing, e.g., every several hours for a few days in the timer unit 180. The control unit 100 may also acquire several patterns of an image of the daytime in which the sunlight or weather is different and an image of the night. Further, the control unit 100 may average the captured images by the image processing unit 160 and store the average image as the reference image data 111.

Further, e.g., after a predetermined period of several months has elapsed, the control unit 100 may update the reference image data 111 by performing the initial image capturing process again.

Next, in step S102, the control unit 100 performs a communication status checking process.

Specifically, the control unit 100 confirms the status of the radio communications by using the signal intensity measuring unit 130 and the synchronism detecting unit 135. In this case, the control unit 100 detects a communication error related to the failure of the radio communications.

Specifically, the signal intensity measuring unit 130 measures the received signal intensity such as a S/N ratio or the intensity of the radio signal received from the radio transmitting/receiving unit 120 and notifies it to the control unit 100.

Further, the synchronism detecting unit 135 detects a preamble or synchronizing signal included in the radio signal received by the radio transmitting/receiving unit 120 to restore the synchronizing signal and detect whether the synchronizing signal has been restored. The synchronism detecting unit 135 notifies the control unit 100 of that a failure of the radio communications has occurred and a communication error has been detected when the synchronizing signal has not been restored. Further, the synchronism detecting unit 135 may notify the control unit 100 of that a communication error has been detected when the synchronizing signal has not been restored several times sequentially. Further, the synchronism detecting unit 135 calculates the amount of transmission data per predetermined time of the data communication, and notifies it to the control unit 100.

Further, the synchronism detecting unit 135 may also notify the control unit 100 of that the synchronizing signal has been restored during the radio communications. This configuration may be implemented depending on the characteristics of each radio system, and information required for investigation of the cause of the disconnection of the radio communications.

Next, in step S103, the control unit 100 determines whether there is a reception error or not.

Specifically, if a communication error has been detected by the synchronism detecting unit 135, the control unit 100 determines "Yes." Further, if the intensity of the received signal measured by the signal intensity measuring unit 130 is lower than or higher than the predetermined signal intensity/image-capture threshold value 113, the control unit 100 determines "Yes." Other cases are considered as a normal state of the radio transmission and reception by the radio transmitting/receiving unit 120, and thus, the control unit 100 determines "No."

The control unit 100 allows the process to proceed to step S104 in the case of "Yes," while the control unit 100 allows the process to proceed to step S105 in the case of "No".

If there is a reception error, in step S104, the control unit 100 performs a current state imaging process.

Specifically, the control unit 100 instructs the imaging unit 150 to capture an image. Thus, the imaging unit 150 captures a still image and transmits the captured still image to the image processing unit 160.

The image processing unit 160 converts the still image into a predetermined format, and temporarily stores it as the captured image data 112 in the storage unit 110. Further, the image processing unit 160 may store the captured image data 112 in any one of an internal flash memory, a DRAM (Dynamic Random Access Memory) and a removable recording medium of the storage unit 110.

Thereafter, the control unit 100 allows the process to proceed to step S106.

If there is no reception error, in step S105, the control unit 100 performs a timer imaging process.

In this case, the control unit 100 instructs the imaging unit 150 to capture an image by an interrupt or the like of the timer unit 180. Accordingly, the imaging unit 150 captures images at predetermined intervals and transmits the captured images to the image processing unit 160. The image processing unit 160 performs format conversion on the captured images by the same process as the current state image capturing process and stores it as the captured image data 112.

Further, the control unit 100 sets the predetermined interval stored in the imaging interval set value 114 in the timer unit 180. As the predetermined interval, e.g., once in a predetermined period ranging from a month to a few months may be set for periodic image capturing (scheduled observation).

Also in the scheduled observation, the control unit 100 may average images captured a predetermined number of times every several hours in day and night in the image processing unit 160.

The control unit 100 may also store the averaged image as the captured image data 112.

Further, the control unit 100 may detect the image capture command from the maintenance device 20 and instruct the imaging unit 150 to capture an image.

In step S106, the control unit 100 performs a captured image analysis process.

In this process, the control unit 100 instructs the image processing unit 160 to compare the images by calculating a difference between the reference image data 111 and the captured image data 112 and perform the analysis of image features. The image processing unit 160 transmits the results of the comparison of the images and the analysis of the image features to the control unit 100.

On the basis of the analysis results of the image processing unit 160, the control unit 100 estimates the cause of the failure of the radio communications and stores it as the cause information in the storage unit 110. The control unit 100 may perform the estimation even when the radio wave conditions such as the intensity of the received signal are changed. The control unit 100 may also perform the estimation even when there is no significant reception error, e.g., even when a reception failure is predicted to occur due to construction of a building or the like.

Specifically, based on the analysis results of the comparison of the images, if the direction of the apparatus is moved by, e.g., an external force, the control unit 100 may recognize it.

Further, based on the analysis results of the comparison of the images, when it is detected that an object serving as an obstacle is toward the center of the captured image which is a transmission/reception direction of the radio waves, the control unit 100 may recognize it. That is, the control unit 100 may detect that the building is being built to be higher. In addition, when the building or the like is built in this manner, the intensity of the received signal is reduced gradually, or when construction materials are moved by a crane, a communication error may suddenly occur. Therefore, the control unit 100 may also estimate the cause of the failure of the radio communications from the predetermined conditions by comparing the data related to the communication error with the correlation value of the signal intensity/image-capture threshold value 113 in addition to the comparison of the images.

Further, based on the analysis results of the comparison of the images, the control unit 100 may recognize that a failure of the radio communications occurs when trees are overgrown with leaves as the season changes.

Further, the control unit 100 may estimate the cause of the failure of the radio communications by using the analysis results of the image features. That is, e.g., when detecting an image feature or a characteristic color of the leaves of trees, the control unit 100 may estimate that it is the cause of the failure of the radio communications.

Further, based on the analysis results of the image features, the control unit 100 may estimate a decrease in received signal intensity due to rainfall. For example, the control unit 100 may estimate the rainfall by obtaining the analysis results that the image is blurred if an edge component (XOR component) of the image is small due to the rain adhering to the lens or cover of the imaging unit 150. In addition, the control unit 100 may estimate the rainfall by detecting the rain using sensors, or obtaining weather information from the Internet or the like.

Further, in the captured image data 112, if it is impossible to detect an infrared laser signal from the laser output unit 170 of the opposing radio communication apparatus 11, the control unit 100 may estimate that there is an obstacle (object) since "view" is removed.

The control unit 100 stores the estimation results as the cause information in the storage unit 110.

Next, in step S107, the control unit 100 determines whether the failure of the radio communications is estimated in the image analysis or reception of radio signals.

In step S107, if it is determined that there is a reception error in the step S103, the control unit 100 determines "Yes." Further, even when it is estimated that there is no reception error but the failure of the radio communications is to be predicted, the control unit 100 determines "Yes." In other cases, the control unit 100 determines "No."

In the case of "Yes," the control unit 100 allows the process to proceed to step S108.

In the case of "No," the control unit 100 ends the image capturing process in accordance with the present embodiment and continues the communication status checking process and transmission and reception of radio waves.

If there is a reception error or a failure of the radio communications is estimated, in step S108, the control unit 100 performs an alert process.

In this case, the control unit 100 summarizes the cause information regarding the reception error and the estimation results and the captured image data 112, and transmits them as the alert information 115 from the network transmitting/receiving unit 140 to the maintenance device 20.

At this time, a large capacity file such as the captured image data 112 is transmitted so as not to affect as much as possible the radio communications by the radio transmitting/receiving unit 120. The control unit 100 performs the transmission, at a predetermined protocol such as FTP, by converting the data into packets of Ethernet®. In this case, the control unit 100 may perform the transmission if the transmission data amount per unit time of the radio transmitting/receiving unit 120 is small or may transmit the image data compressed.

Further, in the case where the reference image data 111 and the captured image data 112 are stored in a removable recording medium in the storage unit 110, it may be separated and browsed by using a card reader or the like of the maintenance device 20. Further, by using the radio communication apparatus 10 as a NAS (Network Attached Storage), the alert information 115 may be acquired directly via the FTP or the like. Further, by providing a display unit such as a LCD monitor in the radio communication apparatus 10, it is also possible to display an image or text of the alert information 115.

In addition, the control unit 100 may transmit the reference image data 111, the captured image data 112, the results of the comparison of the images and the analysis of the image features, the received signal intensity and the like to the maintenance device 20 periodically or according to the manager's instructions.

In this case, the control unit 200 of the maintenance device 20 receives the alert information 115 by the network transmitting/receiving unit 240 and stores the received alert information 115 in the storage unit 210. Then, the control unit 200 displays the information included in the alert information 115 on the display unit 220 by using the maintenance program 211.

FIG. 6 shows a display example 500 displayed on the display unit 220 of the maintenance device 20. The control unit 200 may convert a plurality of images of the captured image data 112, the reference image data 111, a difference image thereof, moving images and the like, and display the converted data. Further, the control unit 200 may display the averaged image and the images before averaging on the display unit 220.

In addition, the control unit 200 displays, as shown in the display example 500, a cross mark 550, messages 560 and 570 and the like on the display unit 220.

The cross mark 550 is drawn at the center of the display example 500 to indicate the direction of directivity of the antenna and a high gain range of the antenna. That is, when installing the radio communication apparatus 10, the manager installs it so that the cross mark 550 accords with the direction of the opposing radio communication apparatus 11. Then, as described above, when an object such as an obstacle or a building is likely to interfere with the radio communications, it is possible to quickly recognize it by using the cross mark 550.

Further, the messages 560 and 570 are information on the image capturing time of the corresponding image, the reception error, the estimation of the radio communication failure and the like. Thus, the manager may quickly identify the true cause of the radio communication failure.

Further, the cross mark 550 or the messages 560 and 570 may be added in the image data included in the alert information 115 by the control unit 100 of the radio communication apparatus 10. Thus, it is possible to recognize the failure by only a web browser or the like (not shown) of the maintenance device 20.

Further, the control unit 200 of the maintenance device 20 may detect the instructions of the manager, and instruct the radio communication apparatus 10 (or 11) to capture an image. Further, the control unit 200 of the maintenance device 20 may acquire the reference image data 111 and the captured image data 112 via the network transmitting/receiving unit 140, direct connection, a removable recording medium or the like to display the data on the display unit 220.

Thus, an image capturing process in accordance with the embodiment of the present invention is ended.

By the above-described configuration, the following effects can be obtained.

First, the conventional P-to-P radio communication apparatus as described in Related Art 2 is often installed in a high place such as a steel tower and a roof. Accordingly, it was difficult for maintenance personnel to go to the site and discover the cause for each case.

On the other hand, in the radio communication system X in accordance with the embodiment of the present invention, without visiting the installation location of the radio communication apparatus 10 (or 11), it is possible to check an object such as an obstacle or a building expected to become an obstacle within the "view." Further, even when the direction of the apparatus is shifted for some reason such as wind, it can be confirmed without visiting the site. Thus, since the maintenance of the radio communication system X can be easily performed, it is possible to reduce the maintenance costs.

Further, the radio communication system X may check the view between the radio communication apparatuses 10 and 11 from the maintenance device 20 when needed throughout the year. Thus, it is possible to determine a possibility that the building becomes an obstacle after the installation. Therefore, it is possible to reliably secure a line for the radio communications.

Further, Related Art 1 merely discloses browsing an image to adjust the direction of the antenna.

On the other hand, in the radio communication apparatus 10 (or 11) in accordance with the embodiment of the present invention, by comparing the reference image data 111 with the captured image data 112, it is possible to estimate the cause of the failure of the radio communications during the operation, or whether the radio wave condition is likely to become worse afterwards or not. Thus, the manager can discover in advance the true cause of the failure of the radio communications without going to the site, and it is possible to reduce the load of the maintenance.

In addition, the imaging unit 150 of the radio communication apparatus 10 (or 11) is configured such that the optical axis of the camera cannot be changed by a camera platform or the like due to a narrow angle of view. Thus, the installation can be made with less privacy concerns.

As described above, the embodiments in accordance with the present invention have the following features.

The radio communication apparatus 10 in accordance with the embodiment of the present invention includes the radio transmitting/receiving unit 120 using the directional antenna and the imaging unit 150 in which the optical axis of the camera is oriented in the same direction as the radio wave direction. The control unit 100 allows the imaging unit 150 to capture an image by the image capture command generated periodically, the change of the intensity of the received signal from the radio transmitting/receiving unit 120, or the image capture command from the maintenance device 20 and stores the captured image as the captured image data 112.

The radio communication apparatus 10 in accordance with the embodiment of the present invention includes the image processing unit 160 to compare the reference image data 111 with the captured image data 112, and perform analysis by calculating the image features from the captured image data 112. The control unit 100 detects the presence or absence of an obstacle (object) which leads to changes in the propagation environment of the radio communications from the results of the analysis of the image features or the comparison of the images, or detects the presence or absence of a building under construction or the like which may cause a failure afterwards and notifies it as the alert information 115 including the estimation of the cause to the maintenance device 20.

The maintenance device 20 in accordance with the embodiment of the present invention is characterized in that, when displaying the captured image, the location of the opposing radio communication apparatus 10 or 11, the radio wave direction of the radio communication apparatus 10 or 11 that is its managing target, or the mark at the center of the angle of view or the like is displayed.

The radio communication system X in accordance with the embodiment of the present invention includes the radio communication apparatuses 10 and 11 as master/slave apparatuses. The radio communication apparatus 10 or 11 includes the radio transmitting/receiving unit 120 to receive a radio transmission signal from a radio transmission device, the synchronism detecting unit 135 to detect a radio synchronizing signal, the storage unit 110 to temporarily store the captured data, the imaging unit 150 to perform image capturing and the control unit 100 to determine an image capture timing from the synchronization signal. The imaging unit 150 performs image capturing when the synchronization signal is not detected.

The radio communication system X in accordance with the embodiment of the present invention transmits and receives radio frames in an uplink direction (from the slave apparatus to the master apparatus) or in a downlink direction (from the master apparatus to the slave apparatus) between the master apparatus and the slave apparatus. Each of the master apparatus and the slave apparatus includes the imaging unit 150 for capturing a still image or moving image, and transmission and reception of data are performed in a manner of time-division duplex (TDD) communication.

The radio communication system X in accordance with the embodiment of the present invention transmits and receives radio frames in the uplink/downlink directions between the master apparatus and the slave apparatus. Each of the master apparatus and the slave apparatus includes the imaging unit 150 for capturing a still image or moving image, and transmission and reception of data are performed in a manner of frequency-division duplex (FDD) communications.

Further, the configuration and operation of the above-described embodiment are exemplary and may be modified appropriately without departing from the scope of the present invention.

INDUSTRIAL APPLICABILITY

The present invention is applicable to estimation of a cause of a failure of radio communications in a radio communication apparatus, a radio communication method and a radio communication system.

DESCRIPTION OF REFERENCE NUMERALS 5, 6 network
10, 11 radio communication apparatus
20 maintenance device
30 obstacle
100, 200 control unit
110, 210 storing unit
111 reference image data
112 captured image data
113 signal intensity/image-capture threshold value
114 imaging interval set value
115 alert information
120 radio transmitting/receiving unit
130 signal intensity measuring unit
135 synchronism detecting unit
140, 240 network transmitting/receiving unit
150 imaging unit
160 image processing unit
170 laser output unit
180 timer unit
190 housing
191 installation portion
195 scope portion
211 maintenance program
220 display unit
230 input unit
500 display example
550 cross mark
560, 570 message
X radio communication system

What is claimed is:

1. A P-to-P (point to point) radio communication apparatus for performing opposing communications with another P-to-P radio communication apparatus using a directional antenna, comprising:
    a radio transmitting/receiving unit using the directional antenna; and
    an imaging unit having an optical axis which coincides with a direction of radio waves of the directional antenna, the imaging unit being configured to capture images in the direction of the radio waves,
    an image processing unit configured to convert the images into reference image data and captured image data and compare the reference image data with the captured image data to generate a comparison result;
    a storage unit for storing the captured image data and the reference image data captured;
    a control unit configured to determine, if it is detected that the object is toward a center of the captured image from the comparison result, that an object is toward a direction to block the radio waves and notify alert information, and wherein the alert information includes a cross mark drawn at the center of a display to indicate a direction of directivity of the antenna and a high gain range of the antenna.

2. A opposing radio communication method using a P-to-P (point to point) radio communication apparatus having a directional antenna, comprising:
    capturing images in a direction of radio waves of the directional antenna by an imaging unit, the direction of the radio waves coinciding with an optical axis of the imaging unit;
    converting the images into reference image data and captured image data and comparing the reference image data with the captured image data to generate a comparison result by an image processing unit;
    storing the captured image data and the reference image data in a storage unit;
    determining, if it is detected that the object is toward a center of the captured image from the comparison result, that an object is toward a direction to block the radio waves and notifying alert information, and
    drawing a mark in the direction of the radio waves of the captured image and a high gain range of the antenna.

3. A radio communication system for P-to-P (point to point) communications comprising:
    P-to-P radio communication apparatuses arranged to face each other; and
    a maintenance device of the radio communication apparatuses,
    wherein each of the P-to-P radio communication apparatuses includes:
    a radio transmitting/receiving unit using a directional antenna; and
    an imaging unit having an optical axis, which coincides with a direction of radio waves of the directional antenna, to capture images in the direction of the radio waves,
    an image processing unit configured to convert the images into reference image data and captured image data and compare the reference image data with the captured image data to generate a comparison result,
    a storage unit to store the captured image data and the reference image data captured;
    a control unit configured to determine, if it is detected that the object is toward a center of the captured image from the comparison result, that an object is toward a direction to block the radio waves and notify alert information to the maintenance device, and
    wherein the maintenance device includes:
    a display unit for displaying images captured by each of the P-to-P radio communication apparatuses; and
    a controller configured to draw a mark in the direction of the radio waves of the captured image and a high gain range of the antenna.

* * * * *